(12) United States Patent
Choi et al.

(10) Patent No.: US 10,278,054 B2
(45) Date of Patent: Apr. 30, 2019

(54) METHOD AND APPARATUS FOR COMMUNICATING IN WIRELESS PERSONAL AREA NETWORK COMMUNICATION SYSTEM

(71) Applicant: ELECTRONICS AND TELECOMMUNICATIONS RESEARCH INSTITUTE, Daejeon (KR)

(72) Inventors: Jee Yon Choi, Daejeon (KR); Jae Woo Park, Daejeon (KR); Moon Sik Lee, Daejeon (KR); Jae Seung Lee, Daejeon (KR); Young Hoon Kim, Daejeon (KR); Gyung Chul Shin, Daejeon (KR); Hoo Sung Lee, Daejeon (KR); Ik Jae Chun, Daejeon (KR); Dong Seung Kwon, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 73 days.

(21) Appl. No.: 15/134,595

(22) Filed: Apr. 21, 2016

(65) Prior Publication Data

US 2016/0316504 A1     Oct. 27, 2016

(30) Foreign Application Priority Data

Apr. 21, 2015  (KR) .................. 10-2015-0055726
Jul. 9, 2015   (KR) .................. 10-2015-0097520

(Continued)

(51) Int. Cl.
    *H04W 8/00*     (2009.01)
(52) U.S. Cl.
    CPC ....... *H04W 8/005* (2013.01); *H04B 2201/694* (2013.01)
(58) Field of Classification Search
    CPC .................................................. H04W 8/005
    See application file for complete search history.

(56) References Cited

U.S. PATENT DOCUMENTS

| 8,533,781 B2 | 9/2013 | Tie et al. |
| 2001/0055297 A1* | 12/2001 | Benveniste ........... H04W 16/14 370/349 |

(Continued)

FOREIGN PATENT DOCUMENTS

| KR | 2010-0007679 A | 1/2010 |
| KR | 2013-0039669 A | 4/2013 |

*Primary Examiner* — Gregory B Sefcheck
*Assistant Examiner* — Jael M Ulysse
(74) *Attorney, Agent, or Firm* — LRK Patent Law Firm

(57) ABSTRACT

A method and apparatus for wireless communication in a wireless personal area network (WPAN) communication system. A wireless communication method to be performed by a first wireless communication device includes broadcasting a beacon, receiving an association request signal from a second wireless communication device receiving the beacon, and performing association with the second wireless communication device after receiving the association request signal, in which the first wireless communication device may suspend beacon transmission after the association with the second wireless communication device is established.

4 Claims, 14 Drawing Sheets

(30) Foreign Application Priority Data

Apr. 20, 2016 (KR) ........................ 10-2016-0048319
Apr. 20, 2016 (KR) ........................ 10-2016-0048333

(56) References Cited

U.S. PATENT DOCUMENTS

| | | | |
|---|---|---|---|
| 2003/0063619 A1* | 4/2003 | Montano | H04L 29/12009 370/443 |
| 2003/0140296 A1* | 7/2003 | Odman | H04L 47/323 714/749 |
| 2004/0214571 A1* | 10/2004 | Hong | H04W 8/005 455/435.1 |
| 2005/0094657 A1* | 5/2005 | Sung | H04W 72/0406 370/431 |
| 2006/0050728 A1* | 3/2006 | Sung | H04L 12/413 370/448 |
| 2006/0075467 A1* | 4/2006 | Sanda | G06F 21/316 726/1 |
| 2006/0227740 A1* | 10/2006 | McLaughlin | H04W 84/20 370/329 |
| 2006/0268738 A1* | 11/2006 | Goerke | H04B 7/18539 370/254 |
| 2007/0165589 A1* | 7/2007 | Sakoda | H04W 48/08 370/345 |
| 2008/0049703 A1* | 2/2008 | Kneckt | H04W 68/00 370/342 |
| 2009/0103435 A1* | 4/2009 | Celentano | H04W 28/22 370/232 |
| 2009/0147798 A1* | 6/2009 | del Prado Pavon | H04W 74/02 370/461 |
| 2010/0118835 A1* | 5/2010 | Lakkis | H04B 7/0408 370/336 |
| 2010/0177756 A1 | 7/2010 | Choi et al. | |
| 2010/0265922 A1* | 10/2010 | Bracha | H04W 74/0808 370/336 |
| 2010/0278077 A1* | 11/2010 | Reunamaki | H04W 84/18 370/254 |
| 2011/0145890 A1* | 6/2011 | Tie | H04W 12/06 726/3 |
| 2011/0317569 A1* | 12/2011 | Kneckt | H04W 74/0833 370/252 |
| 2013/0079037 A1* | 3/2013 | Dobyns | H04W 4/023 455/456.3 |
| 2013/0195081 A1* | 8/2013 | Merlin | H04W 74/002 370/336 |
| 2013/0279489 A1* | 10/2013 | Calcev | H04W 76/10 370/338 |
| 2014/0334458 A1* | 11/2014 | Park | H04W 72/0446 370/336 |
| 2015/0131539 A1* | 5/2015 | Tsfaty | H04B 11/00 370/329 |
| 2015/0131608 A1* | 5/2015 | Son | H04W 72/10 370/330 |
| 2015/0244428 A1 | 8/2015 | Lee et al. | |
| 2015/0281116 A1 | 10/2015 | Ko et al. | |
| 2016/0309393 A1* | 10/2016 | Amini | H04W 40/244 |

* cited by examiner

FIG. 3C

| octets : 8 | 1 | 1 | 1 | 2 | 2 | 6 |
|---|---|---|---|---|---|---|
| PNC address | PNC response | Piconet mode | Max TX power level | CAP end time | Superframe duration | Time token |

FIG. 3D

| 1 | 3 | 1 | 1 | 2 | 2 |
|---|---|---|---|---|---|
| Stream index | Fragmentation control | SrcID | DestID | PNID | Frame control |
| MAC header ||||||

METHOD AND APPARATUS FOR COMMUNICATING IN WIRELESS PERSONAL AREA NETWORK COMMUNICATION SYSTEM

CROSS-REFERENCE TO RELATED APPLICATIONS

This application claims priority to Korean Patent Application Nos. 10-2015-0055726, 10-2015-0097520, 10-2016-0048319, and 10-2016-0048333, filed Apr. 21, 2015, Jul. 9, 2015, Apr. 20, 2016, and Apr. 20, 2016, respectively, which are hereby incorporated by reference in their entireties into this application.

BACKGROUND

1. Field of the Invention

The following description relates to a method and apparatus for communication in a wireless personal area network (WPAN) communication system.

2. Description of Related Art

A wireless personal area network (WPAN) refers to a network in which wireless communication devices present in a short distance from one another communicate with one another with low power. Recently, technology has been developed to transmit, at a high speed, massive data in a 60 gigahertz (GHz) frequency band using a radio wave having a short wavelength and a high straightness in the WPAN. Thus, a physical layer (PHY) mode of various methods, for example, single carrier (SC), orthogonal frequency-division multiplexing (OFDM), and on-off keying (OOK), may be used in the WPAN.

SUMMARY OF THE INVENTION

According to an aspect of the present disclosure, there is provided a wireless communication method to be performed by a first wireless communication device, the method including broadcasting a beacon, receiving an association request signal from a second wireless communication device receiving the beacon, and performing association with the second wireless communication device after receiving the association request signal. The first wireless communication device may suspend beacon transmission after the association with the second wireless communication device is established.

The first wireless communication device may suspend the beacon transmission until the association with the second wireless communication device is cancelled.

According to another aspect of the present disclosure, there is provided a wireless communication method to be performed by a first wireless communication device, the method including broadcasting a beacon, receiving an association request signal from a second wireless communication device receiving the beacon, and performing association with the second wireless communication device after receiving the association request signal. The first wireless communication device may transmit a beacon in which a superframe duration (SD) is set to be infinite after being associated with the second wireless communication device.

The first wireless communication device may suspend transmission of the beacon in which the SD is set to be infinite after the association with the second wireless communication device is established.

According to still another aspect of the present disclosure, there is provided a wireless communication method to be performed by a first wireless communication device, the method including broadcasting a beacon, receiving an association request signal from a second wireless communication device receiving the beacon, and transmitting an acknowledgement (ACK) signal to the second wireless communication device in response to the association request signal. The ACK signal may include device identifier (ID) information on a device ID allocated to the second wireless communication device by the first wireless communication device.

The second wireless communication device may determine the device ID of the second wireless communication device based on the device ID information included in the ACK signal.

According to yet another aspect of the present disclosure, there is provided a wireless communication method to be performed by a second wireless communication device, the method including receiving a beacon from a first wireless communication device, transmitting an association request signal to the first wireless communication device, and receiving, from the first wireless communication device, an ACK signal corresponding to the association request signal. The ACK signal may include device identifier (ID) information on a device ID allocated to the second wireless communication device by the first wireless communication device.

According to further another aspect of the present disclosure, there is provided a first wireless communication device including a communicator configured to broadcast a beacon and receive an association request signal from a second wireless communication device receiving the beacon, and a processor configured to control the first wireless communication device to perform association with the second wireless communication device after receiving the association request signal. The processor may control the first wireless communication device to suspend beacon transmission to be suspended after the association with the second wireless communication device is established.

According to still another aspect of the present disclosure, there is provided a first wireless communication device including a communicator configured to broadcast a beacon and receive an association request signal from a second wireless communication device receiving the beacon, and a processor configured to control the first wireless communication device to perform association with the second wireless communication device receiving the association request signal. The communicator may transmit a beacon in which an SD is set to be infinite after the first wireless communication device is associated with the second wireless communication device.

According to still another aspect of the present disclosure, there is provided a wireless communication method including broadcasting a first beacon using a first physical layer (PHY) mode, and broadcasting a second beacon using a second PHY mode. When association with a second wireless communication device is established based on one of the first beacon and the second beacon, use of a PHY mode that is not used for the association may be suspended.

BRIEF DESCRIPTION OF DRAWINGS

FIG. 3C is a diagram illustrating an example of a frame structure of a piconet synchronization parameter illustrated in FIG. 3B.

FIG. 3D is a diagram illustrating an example of a frame structure of a media access control (MAC) header to be transmitted from a second wireless communication device according to an example embodiment.

DETAILED DESCRIPTION OF THE INVENTION

Figure 1:
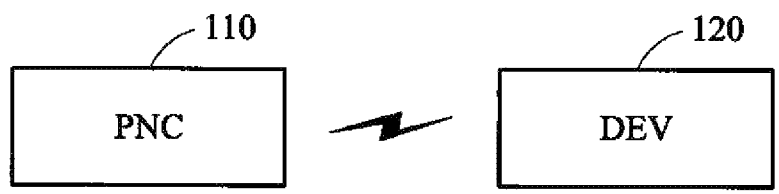
FIG. 1 is a diagram illustrating an example of overall communication between a piconet coordinator (PNC) supporting a plurality of physical layers (PHYs) and a wireless device (DEV) according to an example embodiment.

Structural or functional explanations of example embodiments to be described hereinafter are provided only for the purpose of providing illustrative examples, and modifications are made, in various forms, to the example embodiments. Thus, it should be understood that there is no intent to limit this disclosure to the particular example embodiments disclosed. On the contrary, example embodiments are to cover all modifications, equivalents, and alternatives falling within the scope of the example embodiments.

The terminology used herein is for the purpose of describing particular embodiments only and is not intended to be limiting the present disclosure. Terms such as first, second, A, B, (a), (b), and the like may be used herein to describe components, and each of these terminologies is not used to define an essence, order or sequence of a corresponding component but used merely to distinguish the corresponding component from other component(s). For example, a first component may be referred to as a second component, and similarly, the second component may also be referred to as the first component.

It should also be noted that if it is described in the disclosure that one component is "connected," "coupled," or "joined" to another component, a third component may be "connected," "coupled," or "joined" between the first and second components, although the first component may be directly connected, coupled, or joined to the second component.

In addition, as used herein, the singular forms "a," "an," and "the," are intended to include the plural forms as well, unless the context clearly indicates otherwise. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

Unless otherwise defined, all terms, including technical and scientific terms, used herein have the same meaning as commonly understood by one of ordinary skill in the art to which this disclosure pertains. Terms, such as those defined in commonly used dictionaries, are to be interpreted as having a meaning that is consistent with their meaning in the context of the relevant art, and are not to be interpreted in an idealized or overly formal sense unless expressly so defined herein.

Hereinafter, example embodiments will be described in detail with reference to the accompanying drawings. Regarding the reference numerals assigned to the elements in the drawings, it should be noted that the same elements will be designated by the same reference numerals, wherever possible, even though they are shown in different drawings, and a known function or configuration will be omitted herein.

FIG. 1 is a diagram illustrating an example of overall communication between a piconet coordinator (PNC) supporting a plurality of physical layers (PHYs) and a wireless device (DEV) according to an example embodiment.

In a wireless personal area network (WPAN) communication system, a PNC 110 may communicate with a DEV 120. Hereinafter, the PNC 110 may also be referred to as a first wireless communication device, and the DEV 120 may also be referred to as a second wireless communication device. The WPAN communication system described herein may be a point-to-point communication environment in which only a single DEV 120 may be associated with the PNC 110. In communication between the PNC 110 and the DEV 120, data communication may be performed after association between the PNC 110 and the DEV 120 is established. Here, the association may refer to a setting process for the DEV 120 to transmit data. For example, the association may include setting a communication environment by which a communication target or a PHY mode is selected.

The communication between the PNC 110 and the DEV 120 may be performed through a plurality of PHYs. Here, a PHY may refer to a physical layer among a plurality of layers in communication. WPAN devices supporting different PHY modes may be referred to as a parent piconet and a child piconet, respectively.

According to an example embodiment, a simplified association process may be provided. For example, the PNC 110 may broadcast a beacon, and the DEV 120 may scan the received beacon and transmit an association request signal to the PNC 110. The PNC 110 may then perform the association with the DEV 120 after receiving the association request signal from the DEV 120. Such a process may include transmitting an acknowledgement (ACK) signal to the DEV 120 from the PNC 110. The ACK signal may include device identifier (ID) information on a device ID allocated to the DEV 120 by the PNC 110.

According to an example embodiment, the PNC 110 may suspend beacon transmission after the association with the DEV 120 is established, or suspend beacon transmission after a beacon in which a superframe duration (SD) is set to be infinite is transmitted to the DEV 120. The beacon transmission may be suspended until the association with the DEV 120 is cancelled. By transmitting the beacon in which the SD is set to be infinite, one superframe may continue operating until the association is cancelled. Thus, further beacon transmission may not be needed, and thus transmission efficiency may increase. Alternatively, the setting of the SD to be infinite may be omitted.

According to an example embodiment, such an association process for communication through a WPAN may become more accelerated and effective. Thus, the association between the PNC 110 and the DEV 120 may be more rapidly completed to increase transmission efficiency, and thus a greater amount of data may be exchanged between the two wireless communication devices for a shorter period of time.

The communication between the PNC 110 and the DEV 120 may be performed through a plurality of PHY modes. Here, a PHY may refer to a physical layer among a plurality of layers for the communication. WPAN devices supporting the different PHY modes may indicate a parent piconet and a child piconet, respectively.

To prevent a collision between communications through the plurality of PHY modes in the association process, an available time for communication through each PHY mode may be set. The setting of such a communication available time may be performed using a frame. To prevent a collision between communications through the plurality of PHY modes in the association process, a separate superframe may correspond to each PHY mode. The superframe may include a section, for example, a time section, corresponding to the communication available time through each PHY mode. The section corresponding to the communication available time through each PHY mode may be identified by a beacon in the superframe.

Here, a superframe corresponding to the parent piconet and a superframe corresponding to the child piconet may be referred to a parent piconet superframe and a child piconet superframe, respectively. For example, the PNC 110 supporting two PHY modes may configure the parent piconet superframe using one PHY mode, for example, PHY 1 mode, and configure the child piconet superframe using the other PHY mode, for example, PHY 2 mode. A beacon of the parent piconet may be transmitted through the PHY 1 mode, and a beacon of the child piconet may be transmitted through the PHY 2 mode.

The DEV 120 supporting a plurality of PHY modes may listen to a beacon corresponding to a PHY mode through a reception mode corresponding to the PHY mode. When a reception mode of the DEV 120 does not correspond to a PHY mode on which transmission of a superframe is based, the DEV 120 may not listen to a beacon of the superframe. Also, when a change period of a PHY mode of the PNC 110 differs from a change period of a reception mode of the DEV 120, the DEV 120 may not continuously listen to a beacon of a corresponding superframe.

According to an example embodiment, by varying a transmission period of a beacon included in a superframe corresponding to a PHY mode, the PHY mode of the PNC 110 and a reception mode of the DEV 120 may continuously correspond to each other, and thus the association may be performed.

According to another example embodiment, by suspending, by the PNC 110, transmission of a beacon using a remaining PHY mode that is not used for the association after the association between the PNC 110 and the DEV 120 is established, resource waste may be prevented. Resources may be wasted because one-to-one communication is frequently performed using a WPAN, and a plurality of superframes each corresponding to a plurality of PHY modes is transmitted even after the association is established. Thus, by suspending transmission of a beacon using different PHY modes after the association process is completed, resource waste may be prevented.

Figure 2A:
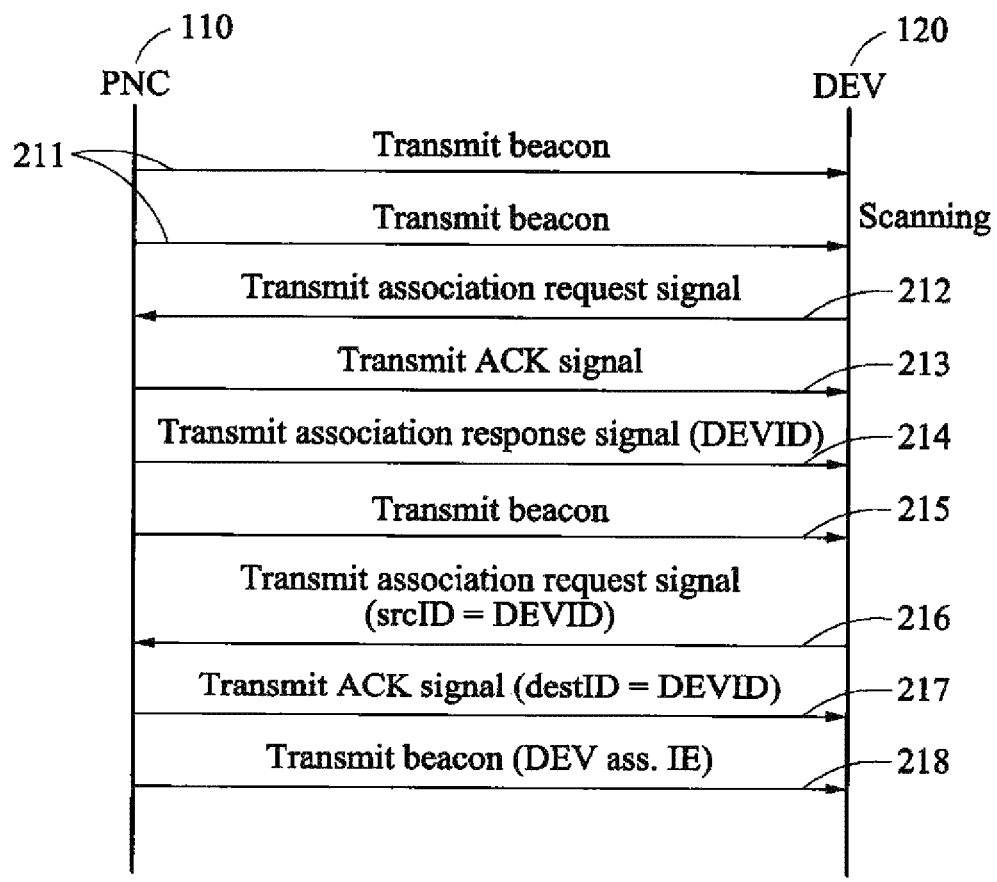
FIG. 2A is a diagram illustrating an example of a process of association between a PNC and a DEV according to related art.

FIG. 2A is a diagram illustrating an example of a process of association between a PNC and a DEV according to related art.

After association between a PNC 110 and a DEV 120 is established, data communication therebetween may be performed.

Referring to FIG. 2A, in stage 211, the PNC 110 may periodically transmit a beacon. The beacon may be transmitted through a broadcasting method. The DEV 120 may receive the beacon and scan the received beacon, and determine whether a PHY mode used to transmit the beacon corresponds to a reception mode of the DEV 120. In stage 212, when the PHY mode corresponds to the reception mode, the DEV 120 may transmit an association request signal to the PNC 110.

Here, a SrcID field included in a media access control (MAC) header of the association request signal may be pre-set to be a value. For example, the SrcID field may be set to be an unassociated ID value, for example, an UnassocID value. According to Institute of Electrical and Electronics Engineers (IEEE) 802.15.3, the UnassocID value may be 0xFE. Here, the UnassocID value may be ID information to be used when unassociated DEVs are to be associated with the PNC 110.

In stage 213, the PNC 110 may receive the association request signal from the DEV 120, and transmit an ACK signal to the DEV 120 in response to the reception of the association request signal. In stage 214, the PNC 110 may allocate a device ID, for example, a DEVID, to the DEV 120, and transmit an association response signal including DEVID information about the allocated DEVID to the DEV 120. Here, a DestID field included in the association response signal may be set to be an UnassocID. The DEV 120 may receive the association response signal, and use the DEVID included in the association response signal as an ID of the DEV 120.

In stage 215, the PNC 110 may periodically transmit a beacon. In stage 216, the DEV 120 may transmit a second association request signal to the PNC 110 for a time section during which transmitting a packet is available. Here, the DEV 120 may set a SrcID field of the association request signal to be the DEVID.

The PNC 110 may receive the second association request signal from the DEV 120. In stage 217, the PNC 110 may transmit a second ACK signal to the DEV 120 in response to the reception of the second association request signal, and set a DestID included in the ACK signal to be a SrcID included in the second association request signal.

The DEV 120 may receive the second ACK signal from the PNC 110, and determine that association between the PNC 110 and the DEV 120 is established. A DEV association information element of a beacon to be transmitted from the PNC 110 in stage 218 may include information about the DEV 120.

However, such a process described with reference to FIG. 2A according to a related art may require, twice, transmission of an association request signal, an association response signal, and an ACK signal, and thus may increase an overhead of a system. Thus, transmission efficiency of the system may decrease due to such an overhead that may occur due to an existing association process and several times of signal transmission.

Figure 2B:
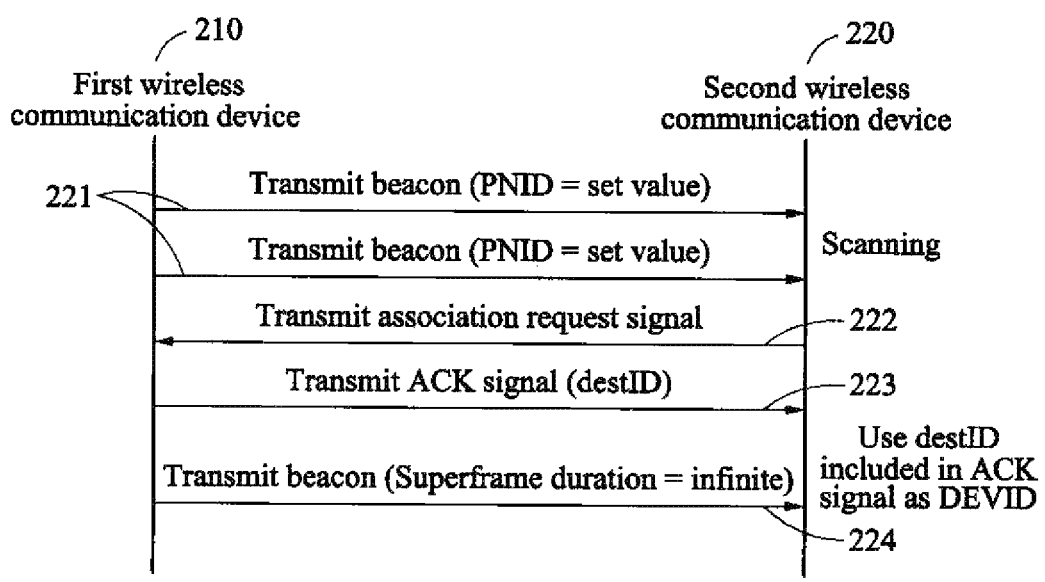
FIG. 2B is a diagram illustrating an example of a process of association between a first wireless communication device and a second wireless communication device according to an example embodiment.

FIG. 2B is a diagram illustrating an example of a process of association between a first wireless communication device and a second wireless communication device according to an example embodiment.

According to an example embodiment, a simplified association process may reduce an overhead of a system and increase transmission efficiency of the system. FIG. 2B illustrates a simplified association process between a first wireless communication device 210 and a second wireless communication device 220. Here, the first wireless communication device 210 may correspond to a PNC described above, and the second wireless communication device 220 may correspond to a DEV described above.

In stage 221, the first wireless communication device 210 may transmit a beacon. The first wireless communication device 210 may periodically broadcast a beacon. Here, a piconet identifier (PNID) field included in a MAC header may be a predefined value, or set to be an arbitrary value. Through scanning, the second wireless communication device 220 may verify whether a beacon using a PHY mode corresponding to a reception mode of the second wireless communication device 220 is received.

In stage 222, the second wireless communication device 220 receiving the beacon from the first wireless communication device 210 may transmit an association request signal to the first wireless communication device 210. When the PHY mode to be identified from the beacon corresponds to the reception mode as a result of the scanning, the second wireless communication device 220 may transmit the association request signal to the first wireless communication device 210. A SrcID included in the association request signal may be set to be an UnassocID. For example, according to IEEE 802.15.3, an UnassocID value may be 0xFE.

The first wireless communication device 210 may receive the association request signal from the second wireless communication device 220. In response to the reception of the association request signal, the first wireless communication device 210 may allocate a DEVID to the second wireless communication device 220. For example, an arbitrary value may be selected as the DEVID. The DEVID may also be referred to as device ID information.

When the association request signal is received from the second wireless communication device 220, the first wireless communication device 210 may perform association with the second wireless communication device 220. In stage 223, the first wireless communication device 210 may transmit an ACK signal to the second wireless communication device 220 in response to the association request signal. The first wireless communication device 210 may set a DestID included in the ACK signal to be the allocated DEVID, and transmit the ACK signal to the second wireless communication device 220.

The second wireless communication device 220 may receive the ACK signal, and determine a device ID of the second wireless communication device 220 based on device ID information on the device ID that is included in the ACK signal. In detail, the second wireless communication device 220 may determine whether the DestID included in the ACK signal is the UnassocID. When the DestID and the UnassocID differ from each other, the second wireless communication device 220 may set the DestID to be the DEVID of the second wireless communication device 220 and determine that the association is established.

In stage 224, after the association is established, the first wireless communication device 210 may transmit a beacon in which an SD is set to be infinite to allow a single superframe to continue operating until the association with the second wireless communication device 220 is cancelled. Thus, there is no need to further transmit a beacon, and thus transmission efficiency may increase. Here, an infinite value set for the SD is provided as an example of a value to be set for an SD, and may not limit a range of examples. According to another example embodiment, such a process of setting an SD to be an infinite may be omitted, and beacon transmission may be suspended until the association with the second wireless communication device 220 is cancelled after the association between the first wireless communication device 210 and the second wireless communication device 220 is established.

Thus, through rapid establishment of association between two wireless communication devices, transmission efficiency may increase and the two wireless communication devices may exchange a greater amount of data for a shorter period of time.

Figure 3A:
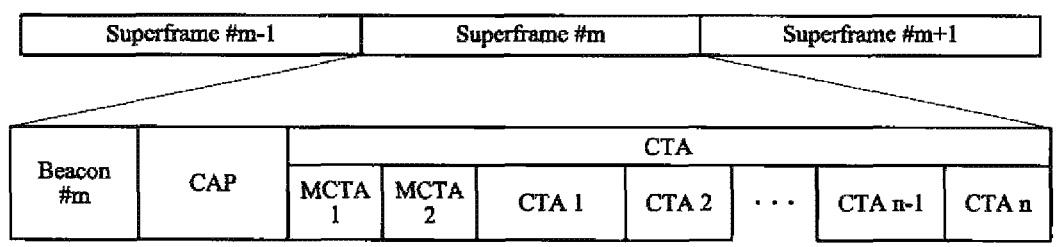
FIG. 3A is a diagram illustrating an example of a structure of a superframe to be transmitted from a first wireless communication device according to an example embodiment.
Figure 3B:
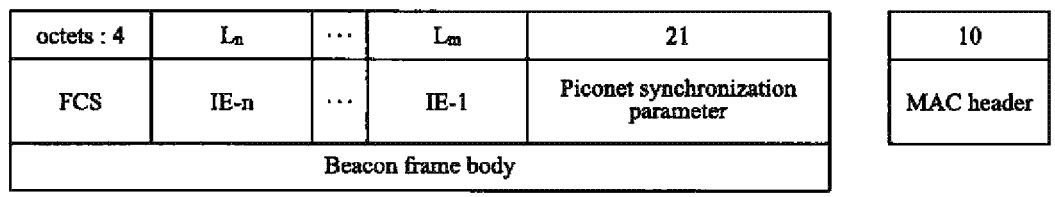
FIG. 3B is a diagram illustrating an example of a frame structure of a beacon in a superframe illustrated in FIG. 3A.

FIG. 3A is a diagram illustrating an example of a structure of a superframe to be transmitted from a first wireless communication device according to an example embodiment. FIG. 3B is a diagram illustrating an example of a frame structure of a beacon in a superframe illustrated in FIG. 3A. FIG. 3C is a diagram illustrating an example of a frame structure of a piconet synchronization parameter illustrated in FIG. 3B. FIG. 3D is a diagram illustrating an example of a frame structure of a MAC header to be transmitted from a second wireless communication device according to an example embodiment.

In an association process, a communication available time for each PHY mode may be set to prevent a collision between communications through a plurality of PHY modes. The setting of the communication available time may be performed using a frame. To prevent the collision between communications through a plurality of PHY modes in the association process, a separate superframe may correspond to each PHY mode. A superframe may include a section corresponding to the communication available time through each PHY mode. The section corresponding to the communication available time through each PHY mode may be identified by a beacon in a superframe.

Referring to FIG. 3A, a superframe for communication in a WPAN based on a PNC is defined in IEEE 803.25.3. The superframe may include a beacon, a contention access period (CAP), and a plurality of channel time allocation (CTA) sections. Here, a CAP and a CIA section may indicate a time section during which transmitting a packet is available. For example, a PNC 110 in PHY 1 mode included in a parent piconet and DEVs may communicate through CTA 2 section included in a superframe of the parent piconet, and the PNC 110 in PHY 2 mode included in a child piconet and DEVs may communicate through CTA 2 section included in a superframe of the child piconet.

Referring to FIG. 3B, a beacon may include a frame check sequence (FCS) a plurality of information element (IE) fields, and a piconet synchronization parameter field. Here, the piconet synchronization parameter field may include information on a temporal length of a superframe and a temporal length of a CAR In detail, referring to FIG. 3C, the piconet synchronization parameter field may include a PNC address field, a PNC response field, a piconet mode maximum transmission (max TX) power level field, a CAP end time field, an SD field, and a time token field. Here, the SD field may include information on a temporal length from a start of a beacon to an end of an SD.

Referring to FIG. 3D, a MAC header may include a stream index field, a fragmentation control field, a SrcID field, a DestID field, a PNID field, and a frame control field. Here, the MID field may include information on an ID to identify a suitable piconet. The SrcID field may include information to identify a device configured to transmit a MAC frame. The DestID field may include information to identify a destination device receiving the MAC frame.

According to an example embodiment, sets of information in the frame structure may be sent, in order, starting from sets of information positioned in a right side of the frame structure illustrated in FIGS. 3B through 3D, but the order is not limited thereto.

Figure 4:
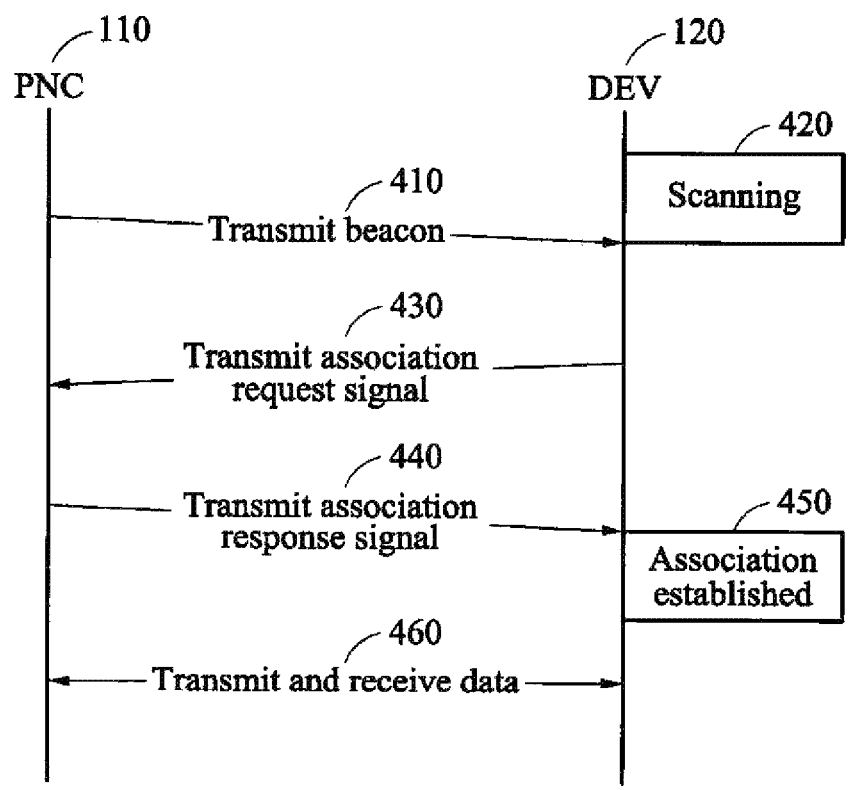
FIG. 4 is a diagram illustrating another example of a process of association between a PNC and a DEV according to an example embodiment.

FIG. 4 is a diagram illustrating another example of a process of association between a PNC and a DEV according to an example embodiment.

After association between a PNC 110 and a DEV 120 is established, data communication therebetween may be performed. Here, such an association process may include setting a communication environment, for example, selecting a target with which the communication is to be performed and selecting a PHY mode.

Referring to FIG. 4, in stage 410, the PNC 110 may periodically transmit, to the DEV 120, a superframe including a beacon corresponding to a PHY mode. Here, the superframe may be transmitted through a broadcasting method. In stage 420, through scanning, the DEV 120 receiving the beacon may listen to the beacon when being in a reception mode corresponding to the PHY mode of the beacon. For example, when the PNC 110 transmits a beacon in a first PHY mode section, and the DEV 120 receives the beacon in the first PHY mode section, the DEV 120 may listen to the received beacon. However, when the DEV 120 receives the beacon in a different PHY mode section, the DEV 120 may not listen to the beacon received from the PNC 110. The DEV 120 may scan each PHY mode while changing a PHY mode.

In stage 430, when the DEV 120 listens to the beacon received from the PNC 110, the DEV 120 may transmit an association request signal to the PNC 110 in response to the received beacon. In stage 440, the PNC 110 may transmit an association response signal to the DEV 120 in response to the association request signal. In stage 450, the association may be established when the DEV 120 receives the association response signal from the PNC 110. In stage 460, the DEV 120 may receive and transmit data with the PNC 110. When the association between the PNC 110 and the DEV 120 is established based on one of a beacon transmitted using a first PHY mode and a beacon transmitted using a second PHY mode, use of a PHY mode that is not used for the association may be suspended.

Figure 5A:
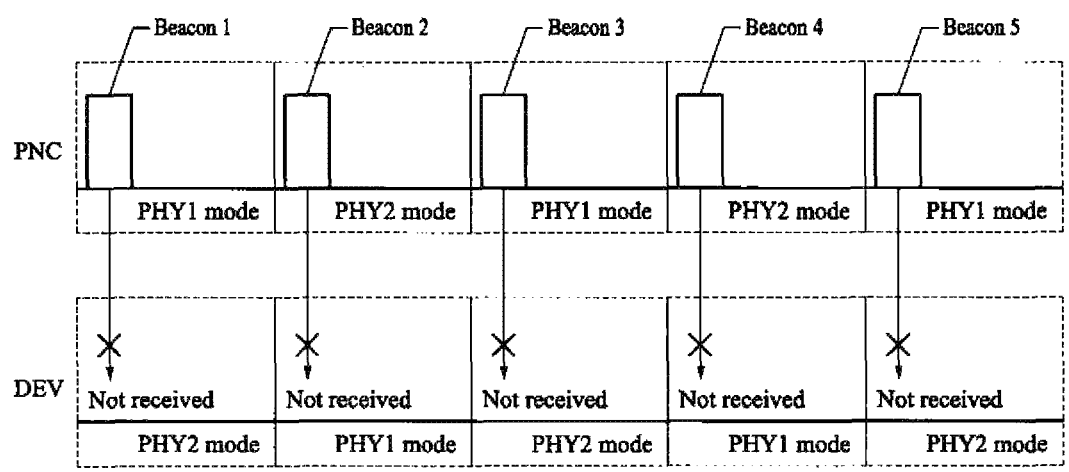
FIG. 5A is a diagram illustrating an example of a state in which listening to a beacon is not available in a process of association for communication between a PNC supporting a plurality of PHYs and a DEV according to an example embodiment.

FIG. 5A is a diagram illustrating an example of a state in which listening to a beacon is not available in an association process for communication between a PNC and a DEV supporting a plurality of PHYs according to an example embodiment.

Referring to FIG. 5A, a DEV 120 supporting a plurality of PHY modes may listen to a beacon, which is a beacon transmitted using a corresponding PHY mode, corresponding to a PHY mode through a reception mode corresponding to the PHY mode. For example, the DEV 120 may listen to a channel for a predetermined period of time to verify presence or absence of a piconet to which the DEV 120 is to be connected. Here, a process of listening to a channel by the DEV 120 may be referred to a scanning process.

As illustrated in FIG. 5A, when a PNC 110 supports two PHY modes, for example, a first PHY mode (PHY 1 mode) and a second PHY mode (PHY 2 mode), the PNC 110 may transmit a superframe including a beacon alternately using the two PHY modes. As illustrated in FIG. 5A, beacon 1, beacon 3, and beacon 5 may be broadcasted through the first PHY mode, and beacon 2 and beacon 4 may be broadcasted through the second PHY mode. The DEV 120 may listen to a channel while changing the two PHY modes, and verify whether a beacon corresponding to a set PHY mode is received.

Here, when the reception mode of the DEV 120 does not correspond to a PHY mode used to transmit a superframe, the DEV 120 may not listen to a beacon in the superframe. When a change period of a PHY mode of the PNC 110 and a change period of the reception mode of the DEV 120 does not correspond to each other, the DEV 120 may not continuously listen to a beacon in the superframe as illustrated in FIG. 5A. For example, when the change periods of the PHY modes of the PNC 110 and the DEV 120 are identical to each other, and the DEV 120 is in the reception mode corresponding to the second PHY mode section in response to the PNC 110 being in the first PHY mode section, the DEV 120 may not listen to a beacon to be transmitted from each PHY mode.

Figure 5B:
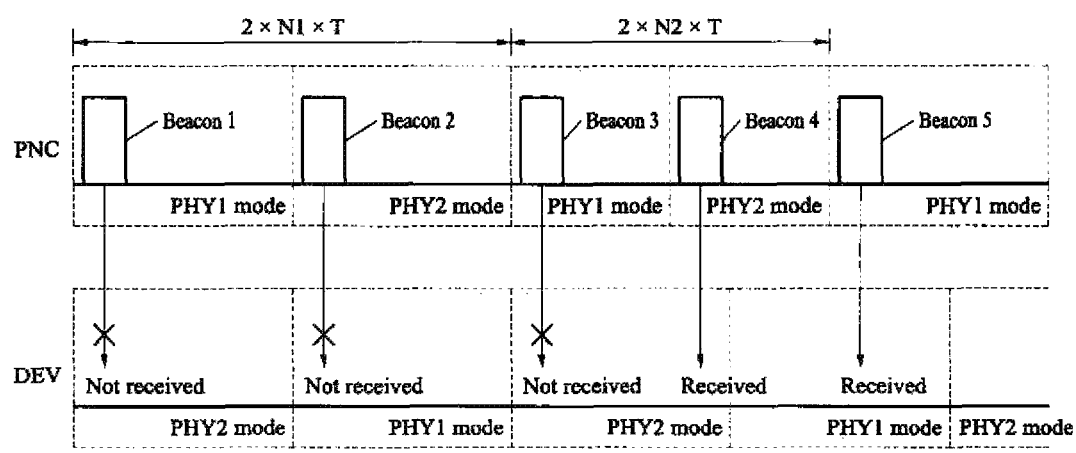
FIG. 5B is a diagram illustrating an example of a state in which listening to a beacon is available in a process of association for communication between a PNC supporting a plurality of PHYs and a DEV according to an example embodiment.

FIG. 5B is a diagram illustrating an example of a state in which listening to a beacon is available in a process of association between a PNC supporting a plurality of PHYs and a DEV according to an example embodiment.

According to an example embodiment, by varying a transmission period of a beacon included in a superframe corresponding to each PHY mode, a DEV 120 may listen to a beacon to be transmitted from a PNC 110. For example, when a first beacon, a second beacon, a third beacon, and a fourth beacon are sequentially broadcasted, the PNC 110 may set, to be different, a first time interval between a point in at which the first beacon is transmitted and a point in time at which the third beacon is transmitted, and a second time interval between a point in time at which the second beacon is transmitted and a point in time at which the fourth beacon is transmitted. Thus, by varying the transmission period of a beacon included in a superframe, a continuous mismatch between a PHY mode used to transmit a beacon by the PNC 110 and a reception mode of the DEV 120 may be prevented.

For example, when a sum of a temporal length of a single beacon and a time used to change a PHY mode is T, the PNC 110 may transmit a beacon corresponding to the same PHY mode at a time interval of a 2×N×T time interval, wherein "N" denotes a value randomly set in a predetermined range.

In such an example, when the time interval between a first beacon signal to be transmitted using the first PHY mode is 2×N1×T, and a time interval between a third beacon signal and a fifth beacon signal is 2×N2×T, a time interval between a second beacon signal and a fourth beacon signal to be transmitted using the second PHY mode may become (N1+N2)×T.

According to an example embodiment, the DEV 120 may maintain, to be identically N1×T, the change period of a reception mode corresponding to a PHY mode to scan a beacon. In such a case, the change period of the PHY mode of the PNC 110 may not match the change period of the reception mode of the DEV 120 corresponding to the PHY mode. Due to such a mismatch, a section in which the reception mode of the DEV 120 corresponds to the PHY mode of the PNC 110 may be generated, and thus the DEV 120 may listen to a beacon received from the PNC 110.

Thus, when the DEV 120 listens to one beacon, the DEV 120 may be aware of an arrival time of a next beacon, and thus communication between the DEV 120 and the PNC 110 may be smoothly performed.

Figure 6A:
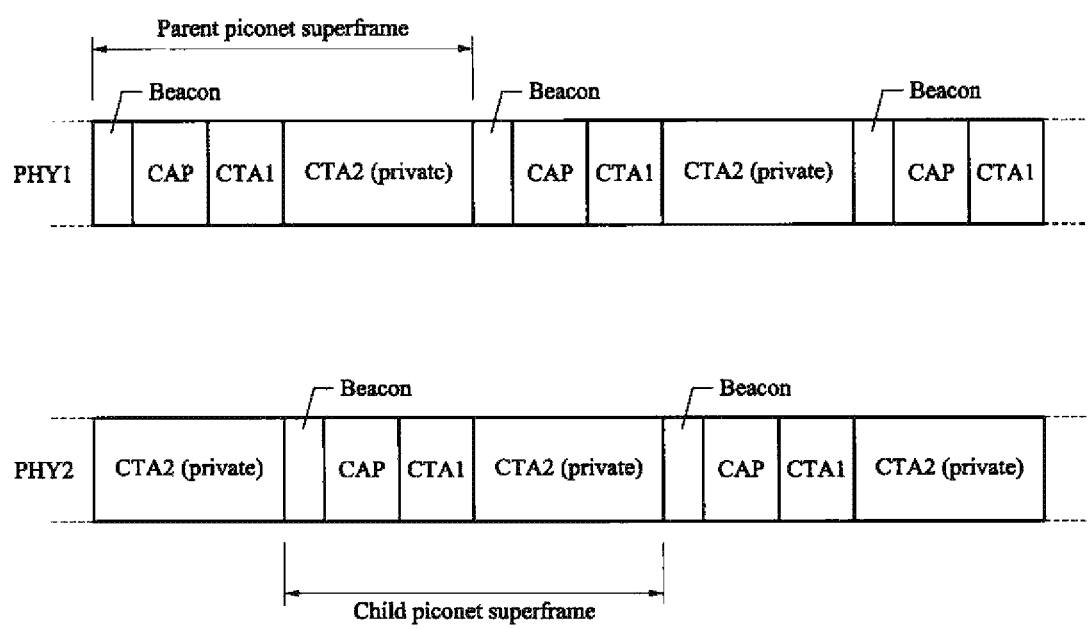
FIG. 6A is a diagram illustrating an example of a relationship between a parent piconet superframe and a child piconet superframe according to an example embodiment.
Figure 6B:
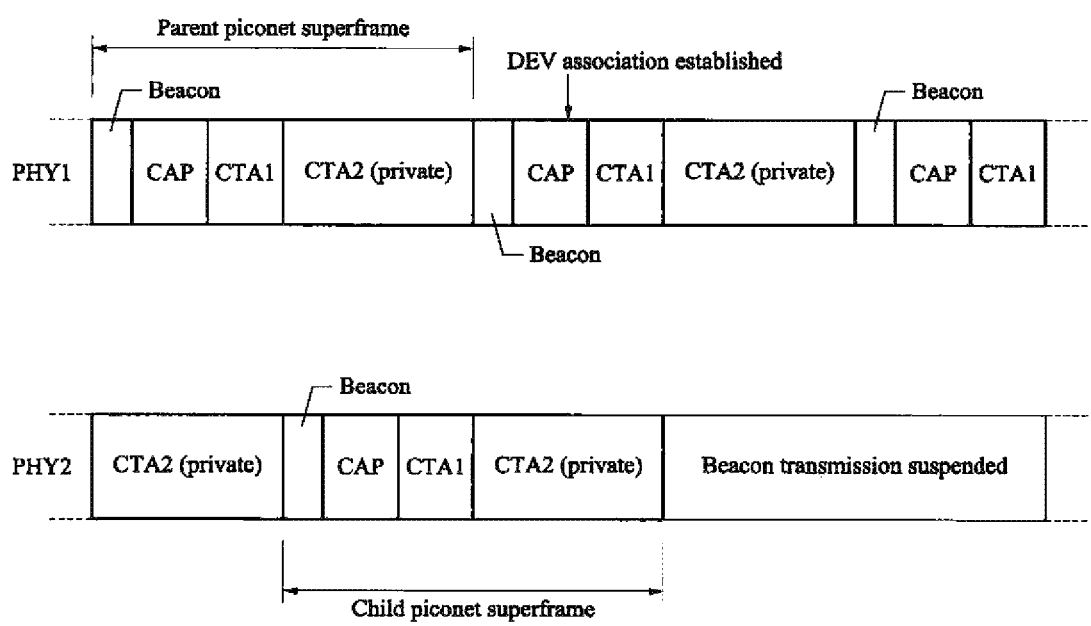
FIG. 6B is a diagram illustrating an example of a state in which a relationship between a parent piconet superframe and a child piconet superframe is disconnected after association between wireless communication devices is established according to an example embodiment.

FIG. 6A is a diagram illustrating an example of a relationship between a parent piconet superframe and a child piconet superframe according to an example embodiment FIG. 6B is a diagram illustrating an example of a state in which a relationship between a parent piconet superframe and a child piconet superframe is disconnected after association is established according to an example embodiment.

When a PNC 110 and a DEV 120 support a plurality of different PHY modes as illustrated in FIG. 6A, a superframe may be set to correspond to each PHY mode. When a parent piconet uses a first PHY mode (PHY 1 mode) and a child piconet uses a second PHY mode (PHY 2 mode), the PNC 110 and DEVs in the first PHY mode included in the parent piconet may communicate with one another through a second CTA section (CTA 2 section) of a parent piconet superframe set to be a private time. In addition, the PNC 110 and DEVs in the second PHY mode included in the child piconet may communicate with one another through a second CTA section (CTA 2 section) of a child piconet superframe set to be a private time. Here, the private time may also be referred to as a reserved time.

Setting the second CIA section of the child piconet superframe and the second CTA section of the parent piconet superframe to be different from each other may prevent a collision in communication through the two PHY modes. However, maintaining a plurality of superframes each corresponding to a plurality of PHY modes even after the association is established may result in waste of resources.

According to an example embodiment, a communication method provided herein may effectively use resources by suspending beacon transmission after association is established. As illustrated in FIG. 6B, such an association may be established when a DEV 120 scans a beacon included in a superframe corresponding to a first PHY mode, between a superframe corresponding to the first PHY mode and a superframe corresponding to a second PHY mode. Here, a PNC 110 may suspend transmission of the superframe, or a beacon, corresponding to the second PHY mode that is not involved in the association, while continuously transmitting the superframe corresponding to the first PHY mode involved in the association with the DEV 120. Thus, unnecessary waste of resources may be prevented.

Figure 7A:
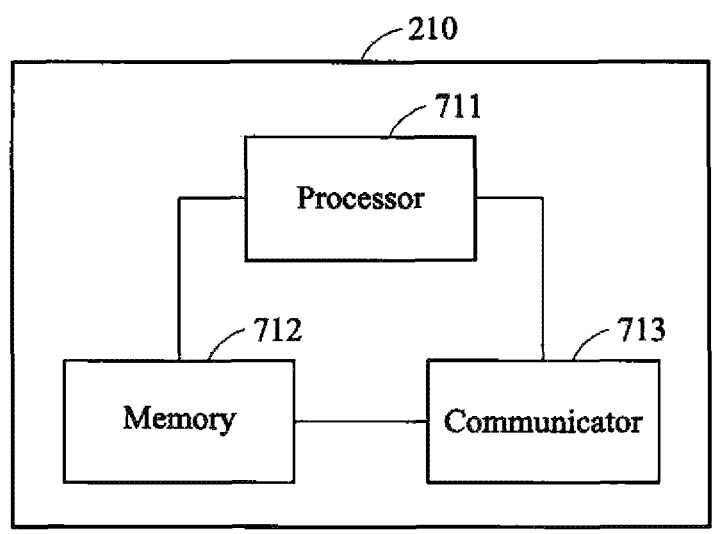
FIG. 7A is a diagram illustrating an example of a structure of a first wireless communication device according to an example embodiment.

FIG. 7A is a diagram illustrating an example of a structure of a first wireless communication device according to an example embodiment. According to an example embodiment, a first wireless communication device 210 may correspond to a PNC 110 described above. Referring to FIG. 7A, the first wireless communication device 210 includes a processor 711, a memory 712, and a communicator 713.

According to an example embodiment, the communicator 713 may broadcast a beacon. The communicator 713 may receive an association request signal from a second wireless communication device 220 receiving the beacon. The memory 712 may store sets of information included in the received association request signal. After the association request signal is received from the second wireless communication device 220, the processor 711 may control the first wireless communication device 210 to perform association with the second wireless communication device 220. According to an example embodiment, after the association with the second wireless communication device 220 is established, the processor 711 may control the communicator 713 to suspend beacon transmission until the association with the second wireless communication device 220 is cancelled. According to another example embodiment, after the association with the second wireless communication device 220 is established, the communicator 713 may transmit a beacon in which an SD is set to be infinite, and suspend beacon transmission until the association with the second wireless communication device 220 is cancelled.

According to an example embodiment, the processor 711 may allocate device ID information on a device ID to the second wireless communication device 220. The communicator 713 may transmit an ACK signal including the device ID information to the second wireless communication device 220 in response to the association request signal.

According to another example embodiment, the memory 712 may store a parameter to set a communication environment including, for example, a target with which communication is to be performed and a PHY mode. The processor 711 may transmit superframes corresponding to different PHY modes through the communicator 713 using the parameter stored in the memory 712. Here, the processor 711 may differently determine transmission periods of beacons included in the superframes each corresponding to the PHY modes. The communicator 713 may receive the association request signal from the second wireless communication device 210 scanned through a reception mode corresponding to a determined PHY mode. The processor 711 may generate an association response signal corresponding to the received association request signal, and transmit the association response signal to the second wireless communication device 220 through the communicator 713. After the association with the second wireless communication device 220 is established, data may be exchanged between the first wireless communication device 210 and the second wireless communication device 220. In addition, use of another PHY mode that is not used for the association between the first wireless communication device 210 and the second wireless communication device 220 may be suspended.

Figure 7B:
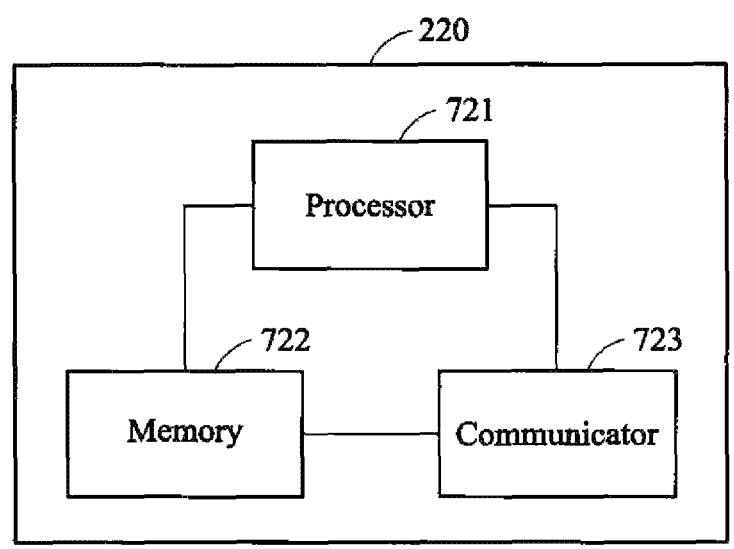
FIG. 7B is a diagram illustrating an example of a structure of a second wireless communication device according to an example embodiment.

FIG. 7B is a diagram illustrating an example of a structure of a second wireless communication device according to an example embodiment. According to an example embodiment, a second wireless communication device 220 may correspond to a DEV 120 described above. Referring to FIG. 7B, the second wireless communication device 220 includes a processor 721, a memory 722, and a communicator 723.

According to an example embodiment, the communicator 723 may receive a beacon from a first wireless communication device 210. The memory 722 may store sets of information included in the received beacon. The processor 721 may generate an association request signal corresponding to the beacon. The communicator 723 may transmit the association request signal to the first wireless communication device 210. The communicator 723 may receive an ACK signal corresponding to the association request signal from the first wireless communication device 210. Here, the ACK signal may include device ID information on a device ID allocated to the second wireless communication device 220 by the first wireless communication device 210.

According to another example embodiment, the memory 722 may store a parameter to set a communication environment including, for example, a target with which communication is to be performed and a PHY mode. The communicator 723 may receive a superframe corresponding to a PHY mode from the first wireless communication device 210. The processor 721 may compare the PHY mode of the received superframe to a reception mode, and determine whether the PHY mode corresponds to the reception mode. When the PHY mode corresponds to the reception mode, the processor 721 may transmit the association request signal to the first wireless communication device 210 through the communicator 723. Conversely, when the PHY mode does not correspond to the reception mode, the processor 721 may continuously scan a superframe. The communicator 723 may receive, from the first wireless communication device 210, an association response signal corresponding to the association request signal. When the processor 721 receives the association response signal, data may be exchanged with the first wireless communication device 210 through the PHY mode that is used for the association with the first wireless communication device 210.

A number of example embodiments have been described above. Nevertheless, it should be understood that various technical changes and modifications may be made to these example embodiments. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A wireless communication method to be performed by a first wireless communication device, the method comprising:
    broadcasting a first beacon using a first physical layer (PHY) mode;
    broadcasting a second beacon using a second PHY mode;
    receiving an association request signal from a second wireless communication device receiving the first beacon;
    performing association with the second wireless communication device,
        wherein the first wireless communication device is configured to stop beacon transmission use of the first PHY mode and second PHY mode after the association with the second wireless communication device,
        wherein a device identifier (ID) is set to the second wireless communication device, and the device ID is determined by the first wireless communication device, and
        wherein when the association is established based on the first beacon, use of the second PHY mode that is not used for the association is stopped; and
    broadcasting a third beacon when the second wireless communication device is disassociated from the first wireless communication device using the first PHY mode,
        wherein when a new association is established based the third beacon with new second wireless communication device, a new device ID is set to the new second wireless communication device, and the new device ID is determined by the first wireless communication device.

2. The method of claim 1, wherein the first wireless communication device communicates with the second wireless communication device in a point-to-point communication environment.

3. The method of claim 1, wherein the performing association with the second wireless communication device after receiving the association request signal comprises transmitting an association response signal to the second wireless communication device in response to the association request signal.

4. The method of claim 3, wherein the association is established when the second wireless communication device receives the association response signal from the first wireless communication device.

* * * * *